United States Patent
Apps et al.

(10) Patent No.: US 7,250,750 B2
(45) Date of Patent: Jul. 31, 2007

(54) SYSTEM AND METHOD FOR TESTING AND ORIENTATION OF COMPONENTS FOR ASSEMBLY

(76) Inventors: Leonard D. Apps, c/o Sterner Automation Limited, 43 Hanna Avenue, Toronto, Ontario (CA) M6K 1X6;
Kenneth G. Kinsman, c/o Sterner Automation Limited, 43 Hanna Avenue, Toronto, Ontario (CA) M6K 1X6;
Timothy A. Freeman, c/o Sterner Automation Limited, 43 Hanna Avenue, Toronto, Ontario (CA) M6K 1X6;
Shelby D. Winkler, c/o Sterner Automation Limited, 43 Hanna Avenue, Toronto, Ontario (CA) M6K 1X6;
Branislav Bezak, c/o Sterner Automation Limited, 43 Hanna Avenue, Toronto, Ontario (CA) M6K 1X6

( * ) Notice: Subject to any disclaimer, the term of this patent is extended or adjusted under 35 U.S.C. 154(b) by 96 days.

(21) Appl. No.: 11/044,313

(22) Filed: Jan. 28, 2005

(65) Prior Publication Data
US 2006/0173654 A1 Aug. 3, 2006

(51) Int. Cl.
*G01R 31/26* (2006.01)
(52) U.S. Cl. .................................. 324/158.1
(58) Field of Classification Search .............. 324/73.1, 324/158.1, 760; 340/635, 653
See application file for complete search history.

(56) References Cited
U.S. PATENT DOCUMENTS

| | | | |
|---|---|---|---|
| 2,895,106 A * | 7/1959 | Taunt ........................ 324/767 |
| 4,663,821 A | 5/1987 | Campisi et al. |
| 4,730,156 A * | 3/1988 | Matsuda ..................... 340/653 |
| 4,768,195 A * | 8/1988 | Stoner et al. ............... 714/736 |
| 4,864,219 A * | 9/1989 | Parsons ..................... 324/73.1 |
| 5,042,668 A | 8/1991 | Hunt et al. |
| 5,578,936 A * | 11/1996 | Gibson et al. .............. 324/767 |
| 5,805,451 A | 9/1998 | Speas et al. |
| 6,000,945 A | 12/1999 | Sanchez-Lazer et al. |
| 6,209,004 B1 | 3/2001 | Taylor |
| 6,222,123 B1 | 4/2001 | Schwarz |
| 6,323,666 B1 * | 11/2001 | Ohba ........................ 324/760 |
| 6,654,650 B1 | 11/2003 | Menzies et al. |
| 6,732,005 B1 | 5/2004 | Bobkin et al. |

FOREIGN PATENT DOCUMENTS

| | | |
|---|---|---|
| JP | 10051199 A2 | 2/1998 |
| JP | 08290381 A2 | 11/2006 |

* cited by examiner

*Primary Examiner*—Vinh P. Nguyen
(74) *Attorney, Agent, or Firm*—Fasken Martineau (57) ABSTRACT

There is disclosed a system and method for testing and orientation of components for assembly, including a component selection tester for testing, prior to assembly, the correct selection of a desired component. The component selection tester includes at least one sensor configured to provide an indication of correct selection only if the desired component is placed for testing on the at least one sensor in a correct orientation for assembly. The sensors may be configurable to provide the indication of correct selection in dependence upon a specified orientation required for assembly. The sensors may also be configurable to test a characteristic of the component. In an embodiment, the component is an electronic component, and the sensors are electrical contacts.

8 Claims, 11 Drawing Sheets

SYSTEM AND METHOD FOR TESTING AND ORIENTATION OF COMPONENTS FOR ASSEMBLY

BACKGROUND

With advances in automated assembly technologies, many manufactured goods are now assembled without any handling by a human operator. However, for more complex assembly tasks, or for assembly volumes that do not justify the cost of automation, a human operator still most efficiently performs the assembly.

By way of example, in the electronics manufacturing industry, the use of surface mount technology ("SMT") components and automated pick and place equipment allow printed circuit boards ("PCBs") to be rapidly populated by a machine. While many PCB assembly tasks may be automated in this manner, certain manual intervention may be required. For example, it may be necessary to manually position one or more "through hole" components (components with leads that extend through holes in the PCB board) on the PCB after most of the assembly has been completed.

In a typical PCB assembly station setup, through hole components are selected by an assembly station operator from a plurality of component bins, and then manually placed by the operator in the required location on the PCB. Well-trained operators may become very efficient in their assembly tasks. However, eventually, the operator will introduce some assembly faults, either due to a faulty component, or due to incorrect placement of a component by the operator. These assembly faults, if caught downstream at a testing station, may require time-intensive re-work. In some cases, re-work may not be possible, and an assembled workpiece may have to be discarded in its entirety at a significant cost. In other cases, assembly faults may not be properly detected, possibly resulting in serious consequences if the workpiece is, for example, an important component of a safety system.

Thus, what is needed is a system and method for guidance of assembly that may reduce the occurrence of assembly errors due to component faults or incorrect placement by an operator.

SUMMARY

The present invention relates to a system and method for guiding assembly, comprising a component selection tester for testing, prior to assembly, the correct selection of a desired component. The component selection tester includes at least one sensor configured to provide an indication of correct selection only if the desired component is in a correct orientation for assembly. The sensors may be configurable to provide the indication of correct selection in dependence upon a specified orientation required for assembly. The sensors may also be configurable to test a characteristic of the component. In an embodiment, the component is an electronic component, and the sensors comprise electrical contacts.

In an aspect of the invention, there is provided a system for guiding assembly, comprising: a component selection tester for testing, prior to assembly, the correct selection of a desired component; wherein, the component selection tester includes at least one sensor, the at least one sensor configured to provide an indication of correct selection only if the desired component is in a correct orientation for assembly.

In an embodiment, there are a plurality of sensors, and the plurality of sensors are configurable to provide the indication of correct selection for one of a plurality of orientations that may be specified for assembly.

In another embodiment, the plurality of sensors are configurable to test a characteristic of the component.

In another embodiment, the component is an electronic component, and the at least one sensor comprises an electrical contact.

In another embodiment, there are a plurality of electrical contacts, and the plurality of electric contacts are configurable to provide the indication of correct selection for one of a plurality of orientations that may be specified for assembly.

In another embodiment, the plurality of electrical contacts are configurable to test an electrical characteristic of the electronic component.

In another embodiment, the system further comprises means for storing a reference value, and means for comparing the reference value to a measured value of the electrical characteristic of the electronic component.

In another embodiment, the indication of correct selection is at least one of visible and audible.

In another embodiment, the system further comprises a component selection indicator for guiding selection of the desired component from one of a plurality of component bins.

In another embodiment, the system further comprises an interactive guide for guiding the assembly of a plurality of components in a sequence.

In another embodiment, the component selection indicator indicates the sequence.

In another embodiment, the interactive guide prevents any further assembly of the plurality of components until the indication of correct selection is provided for each component in the sequence.

In another aspect of the invention, there is provided a method of guiding assembly, comprising: testing, prior to assembly, the correct selection of a desired component using at least one sensor; and providing an indication of correct selection only if the desired component is in a correct orientation for assembly.

In an embodiment, the method further comprises providing a plurality of sensors, and configuring the sensors to provide the indication of correct selection for one of a plurality of orientations that may be specified for assembly.

In another embodiment, the method further comprises configuring the sensors to test a characteristic of the component.

In another embodiment, the component is an electronic component, the at least one sensor comprises an electrical contact, and the method further comprises providing a plurality of electrical contacts, and configuring the plurality of electric contacts to provide the indication of correct selection for one of a plurality of orientations that may be specified for assembly.

In another embodiment, the method further comprises configuring the plurality of electrical contacts to test an electrical characteristic of the electronic component.

In another embodiment, the method further comprises storing a reference value, and during testing, comparing the reference value to a measured value of the electrical characteristic of the electronic component.

In another embodiment, the method further comprises providing at least one of a visible and an audible indication for said indication of correct selection.

In another embodiment, the method further comprises guiding selection of the desired component from one of a plurality of component bins.

In another embodiment, the method further comprises guiding the assembly of a plurality of components in a sequence using an interactive guide.

In another embodiment, the method further comprises indicating the sequence by the component selection indicator.

In another embodiment, the method further comprises preventing any further assembly of the plurality of components until the indication of correct selection is provided for each component in the sequence.

These and other aspects of the invention will become apparent from the following more particular descriptions of exemplary embodiments.

BRIEF DESCRIPTION OF THE DRAWINGS

In the figures which illustrate exemplary embodiments of the invention.

DETAILED DESCRIPTION

The present invention relates to a method and system for guiding assembly. Various embodiments of the present invention may be practiced in an operating environment provided by the illustrative data processing system of FIG. 1 and the illustrative assembly station of FIG. 2.

Figure 1:
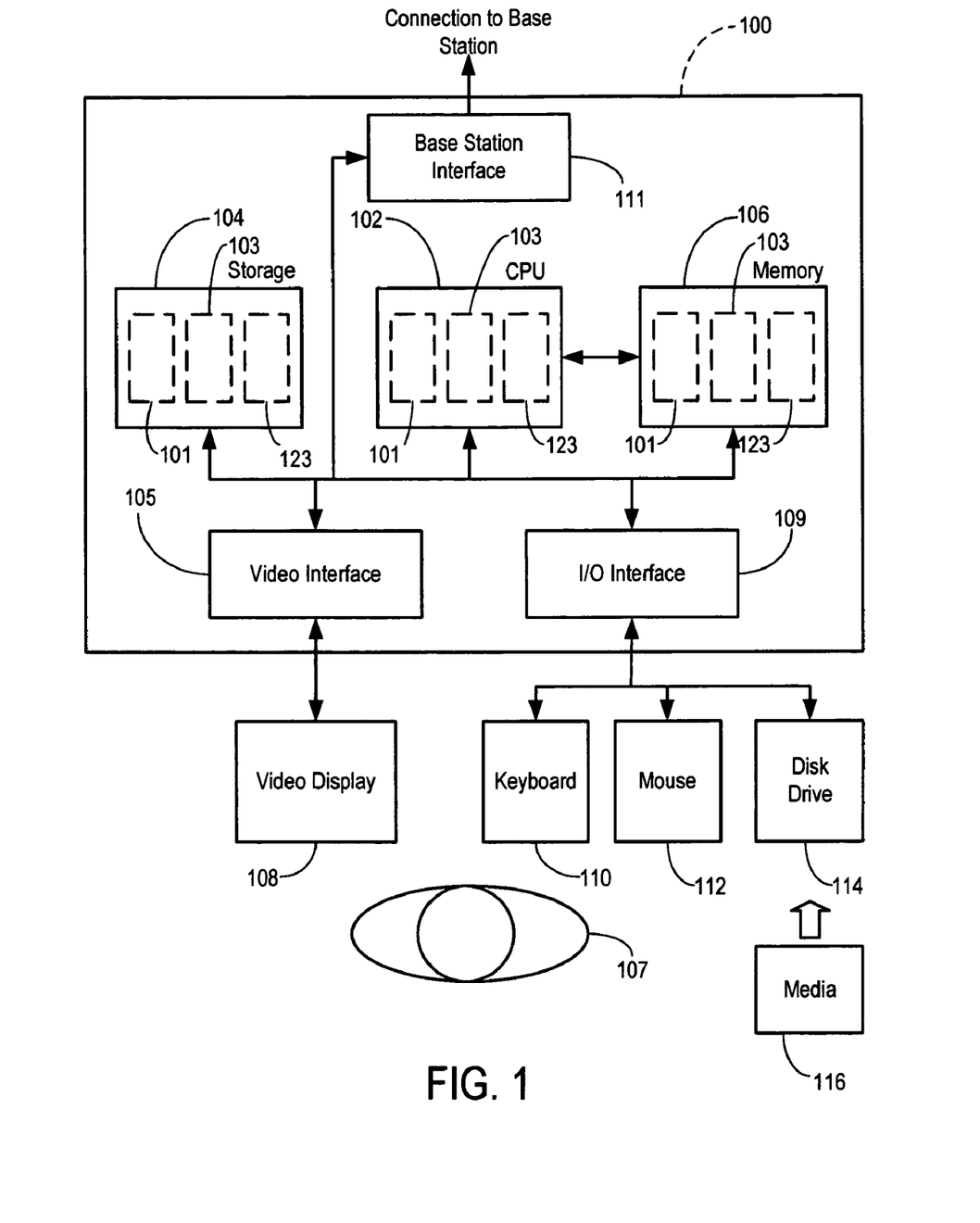
FIG. 1 and FIG. 2A show schematic block diagrams of an illustrative data processing system and an illustrative assembly station, respectively, that may provide an operating environment for various embodiments of the present invention.
Figure 2A:
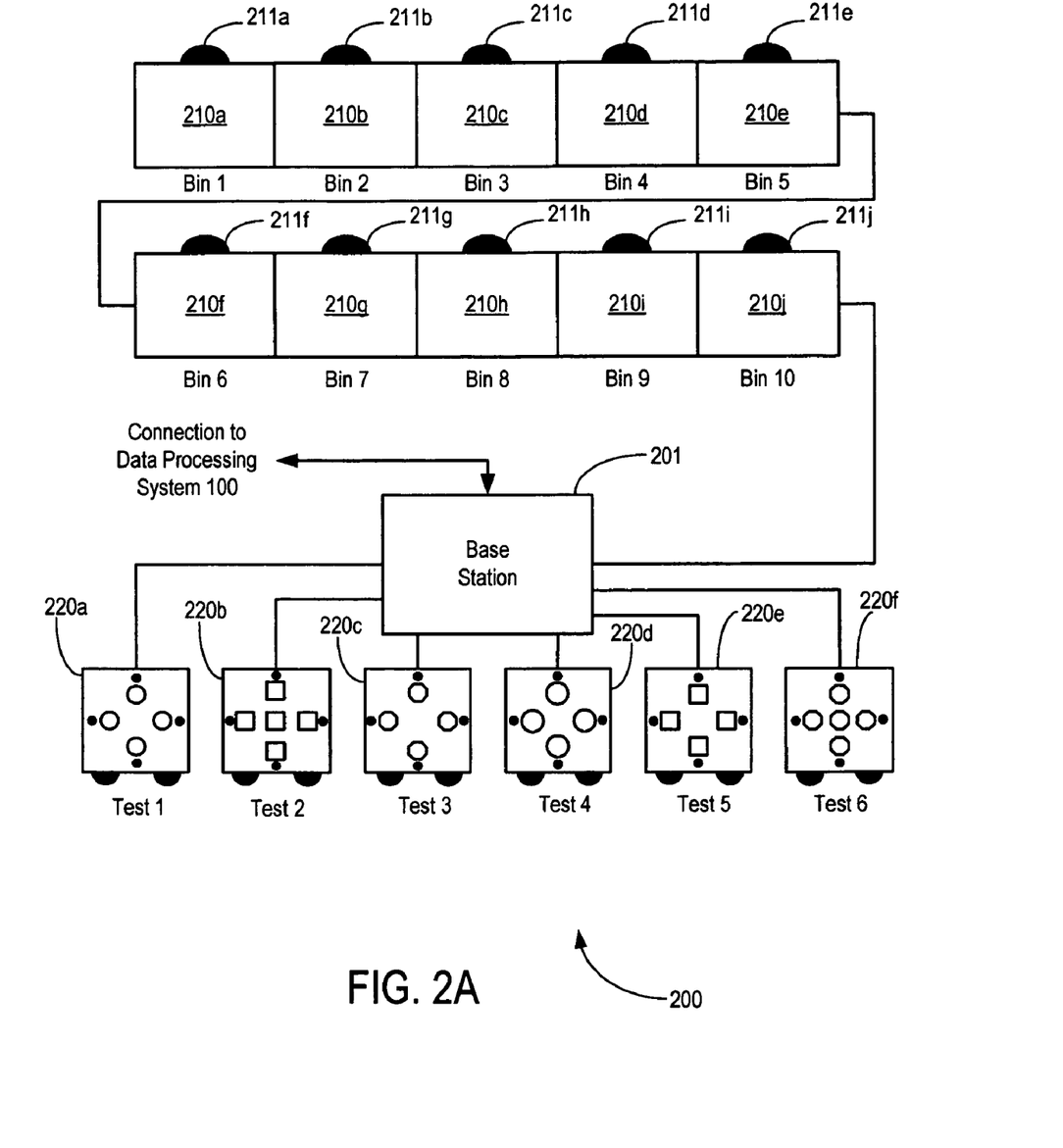

FIG. 1 shows a data processing system 100 that may include a central processing unit ("CPU") 102 connected to a storage unit 104 and to a random access memory 106. The CPU 102 may process an operating system 101, application program 103, and data 123. The operating system 101, application program 103, and data 123 may be stored in storage unit 104 and loaded into memory 106, as required. An operator 107 (e.g. an assembly station operator, or an assembly station supervisor/programmer) may interact with the data processing system 100 using a video display 108 connected by a video interface 105, and various input/output devices such as a keyboard 110, mouse 112, and disk drive 114 connected by an I/O interface 109. In known manner, the mouse 112 may be configured to control movement of a cursor in the video display 108, and to operate various graphical user interface ("GUI") controls appearing in the video display 108 with a mouse button. The disk drive 114 may be configured to accept data processing system usable media 116. The data processing system 100 may be enabled to connect to a base station 201 (FIG. 2) via a base station interface 111, allowing the data processing system 100 to communicate with the base station 201 (FIG. 2).

It will be appreciated that the data processing system 100 illustrated in FIG. 1 is merely illustrative, and is not meant to be limiting in terms of the type of system that may provide a suitable operating environment for practicing various embodiments of the present invention.

FIG. 2A shows a schematic block diagram of an illustrative assembly station 200. Assembly station 200 may include a base station 201 that may be connected to data processing system 100 (FIG. 1) via a suitable communications link. Base station 201 may be connected to a plurality of component storage bins 210a-210j for storing different types of components.

Each bin 210a-210j may have a corresponding component selection indicator 211a-211j that may be used to guide operator 107 in retrieving a component from one of the bins 210a-210j, as will be explained further below. In an embodiment, component selection indicators 211a-211j may be embodied by any suitable indicator, such as light emitting diodes (LEDs), liquid crystal displays (LCDs), incandescent lights, analog gauges, digital gauges, mechanical switches, or the like. Each component selection indicator 211a-211j may be individually controlled (i.e. switched on or off) from the base station 201, as required.

Base station 201 may also be connected to a plurality of test modules 220a-220f, identified in FIG. 2 as "Test 1" to "Test 6". These test modules 220a-220f may be used to perform different tests (one of Test 1 to Test 6) for different types of components selected from the bins 210a-210j, as will be described further below.

Figure 2B:
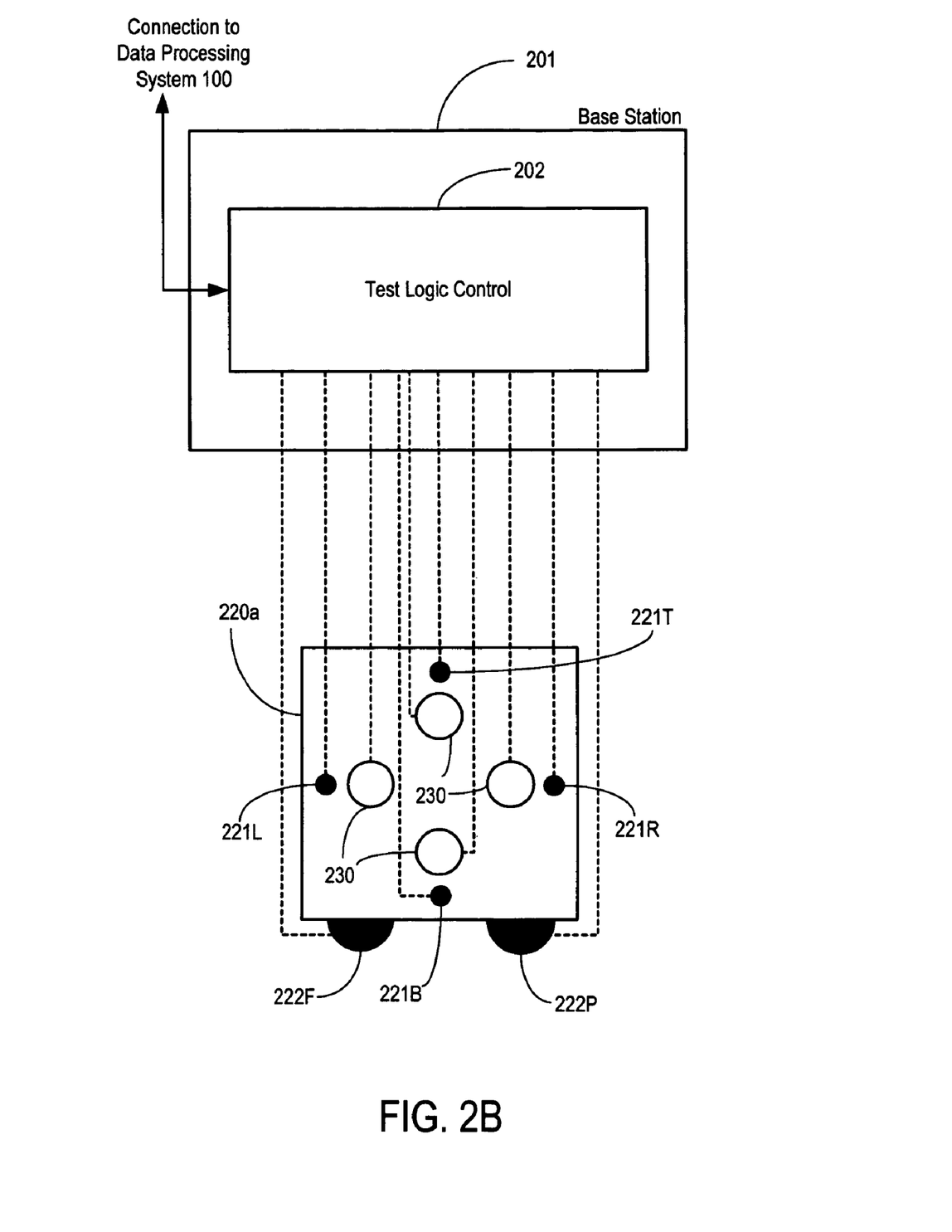
FIG. 2B shows a schematic detail of an illustrative test module that may be included in the assembly station of FIG. 2A.

As detailed in FIG. 2B, test module 220a may include a plurality of test selection indicators that may be used to guide operator 107 to test a component at test module 220a, in the correct orientation. By way of example, a pair of test selection indicators 221L, 221R may indicate that a selected component should be tested at module 220a in a horizontal orientation. Another pair of test selection indicators 221T, 221B may indicate that a selected component should be tested at test module 220a in a vertical orientation.

In an embodiment, test selection indicators 221L, 221R, 221T, 221B may be embodied by any suitable indicator, such as LEDs, LCDs, incandescent lights, analog gauges, digital gauges, mechanical switches, or the like. Each test selection and indicator 221L, 221R, 221T, 221B of test module 220a may be individually controlled (i.e. switched on or off) or controlled in pairs (221L and 221R; 221T and 221B) as required, from a test logic control 202 located in the base station 201. Test logic control 202 may be embodied, for example, as integrated circuitry in combination with control programs accessible by application program 103 of data processing system 100.

Still referring to FIG. 2B, each of test modules 220a-220f may also include test result indicators 222P, 222F that may be used to indicate that a tested component has passed the test, or failed the test. In an embodiment, test result indicators 222P, 222F may be labelled, or may be otherwise distinguished in some manner. For example, a red light may be used for 222F, whereas a green light may be used for 222P. Test result indicators 222P and 222F may also be embodied by any suitable indicator, such as LEDs, LCDs, incandescent lights, analog gauges, digital gauges, mechanical switches or the like. Test result indicator 222P will be switched on only upon successful completion of a test for a component positioned in the correct orientation at test module 220a. This will be explained in further detail below.

In this illustrative example, test module 220a provides a plurality of sensors 230 that may be used to test a characteristic and/or orientation of a selected component. The arrangement of the sensors 230 on test module 220a may be configured to accommodate a certain type of component. For testing electronic components, the plurality of sensors may be electrical contacts.

The other test modules 220b-220f may provide a different arrangement of sensors, and different sizes and shapes of sensors, suitable for testing different types of components. The sensors may be arranged so that a component may be tested in any one of 0, 90, 180 or 270 degrees orientations. If any other orientations are required, it will be appreciated that a suitable configuration of sensors may be arranged.

As illustrated in FIG. 2A, the other test modules 220b-220f have the same configuration of test selection and orientation indicators 221L, 221R, 221T, 221B, and test result indicators 222P, 222F, as test module 220a.

While base station 201 has been shown as a separate device in this illustrative example, it will be apparent to those skilled in the art that the functions of the base station 201 may be integrated within data processing system 100 of FIG. 1.

In a typical assembly operation, a number of assembly steps are performed in sequence. Each assembly step may require selection of a component, testing of the selected component, and installation of the selected component at a target position on the workpiece. For example, in the context of assembly of electronic components onto a PCB, the sequencing, orientation and placement of each electronic component may be critical to successfully completing an assembly operation for a workpiece. This sequence of assembly steps is also known as an assembly "recipe" that should be followed to obtain a desired result.

As described above, various indicators may be provided at the assembly station 200 to guide an operator 107 in selecting, testing, and installing a component. Once a component has been selected, it should be tested to verify that the component is within an acceptable range of tolerance. In addition, the component should be tested to verify that the component is in the correct orientation for assembly.

In an embodiment, application program 103 running on data processing system 100 may be programmed to guide the operator 107 in following an assembly recipe for a workpiece to be built. Initially, it will be necessary for someone to create the assembly recipe from scratch, or by retrieving selected assembly steps from a library. For example, for each installation step, the application program 103 may be programmed to guide an assembly operator 107 by displaying, on video display 108, the component to select and test. Application program 103 may also be programmed to graphically illustrate the correct orientation and placement position of the component on video display 108.

In an embodiment, application program 103 may be programmed to include an assembly recipe "setup wizard" for creating new instruction sets. A prepared assembly recipe template may be used to generate these assembly recipes. A digital camera, or an equivalent, may be used to create still photographs or video clips for detailing the assembly instructions. Application program 103 may be programmed to record before and after pictures, and short video segments that will show components being placed in the correct location. During creation and recording of the assembly recipe, the graphics and video may be imported into the template, and may be stored in a picture library (e.g. as data 123 in storage 104 of FIG. 1) for later playback.

Once an assembly recipe has been created, it should be possible to rearrange that sequence if necessary, so that the assembly recipe may be optimized. All data and graphics associated with a particular assembly step should be movable to another step in the assembly sequence. This is analogous to resorting slides in a slide presentation program.

Preferably, application program 103 may be programmed with different security levels, such as "operator" and "supervisor/set up". This will allow limited access to assembly operators who can playback an assembly recipe, but not edit or modify the assembly recipe. For this purpose, the application program 103 may be programmed to have different modes, including a set up mode, as well as a run mode.

Application program 103 may be configured such that, during playback of an assembly recipe, the completion of each assembly step may be confirmed. In an embodiment, this confirmation may be provided through feedback provided by base station 201 that a successful test indicator 222P has been switched on at the correct test module 222a-222f. Alternatively, the operator 107 may be given manual control over when to proceed to the next assembly step in the assembly recipe. Input to proceed to the next assembly step may be provided by the operator through a push button, touch control, footswitch or the like. However, proceeding to the next assembly step should be inhibited by application program 103 if test indicator 222P has not been switched on to indicate a passed test at the correct test module 222a-222f.

Preferably, application program 103 should allow the operator 107 to step backwards to a previous assembly step, if necessary, in order to retest a component. This may occur, for example, if the operator 107 is interrupted during assembly, and forgets the instructions that were to be followed.

Application program 103 may also be programmed to handle multiple assembly workpiece builds by restarting the assembly recipe from the beginning, and to track the number of pieces built. Application program 103 may also be programmed to recognize assembly workpiece serial numbers (e.g. through optical bar code readers or the like), and to correlate the assembly operator to the assembly workpiece serial number. Application program 103 may thus be programmed to store all information about an assembled piece, including the corresponding date and time of build.

Application program 103 may also be programmed to communicate with base station 201 to provide an indication for selection of a suitable test for the selected component by turning on appropriate test selection indicators 221T, 221B, 221L, 221R at the appropriate test module 220a-220f.

Application program 103 may further be programmed to only proceed to the next assembly step if a test indicator 222P is switched on by a component that is within acceptable tolerances, and is in the correct orientation for assembly.

In the present illustrative embodiment, base station 201 may be configured to house all test logic controls relating to the indicators for controlling the selection, testing and verification of components. As shown in the illustrative example in FIG. 2A, there are six test modules 220a-220f connected to base station 201. These test modules may be configured as plug and play modules that may be interchanged, depending on the type of components that needs to be tested. By way of example, for assembly of electronics components, test modules 220a-220f may be configured to test LEDs, resistance, capacitance, diodes and zener diodes, bipolar and field effect transistors (FETs), etc.

For LEDs, one of the test modules 220a-220f may be configured to test LED intensity, colour, and forward voltage. For resistance measurements, another of the test modules 220a-220f may be configured to test for different tolerances for different ranges of resistance values. For capacitance measurements, another of the test modules 220a-220f may be configured to test for different tolerances for different ranges of capacitance values. For electrolytic capacitors, another of the test modules 220a-220f may also be configured to confirm correct polarity. For diodes and zener diodes, another of test modules 220a-220f may be configured to test forward voltages and zener voltages, with different tolerances for different ranges of values. For bipolar and FET transistors, yet another of the test modules 220a-220f may be configured to test for correct function, correct type of transistor, and correct order of pins (PNP, NPN, etc.).

Depending on testing requirements for an assembly recipe, a test module 220a-220f may be reconfigured using test logic control 202 and application program 103 to test different types of components. For example, a multi-position switch connecting alternative test circuitry, and selectable by test logic control 202 and application program 103, may allow a test module 220a-220f to test for different values of a characteristic of a component (e.g. testing for resistance values within different ranges). As another example, a test module 220a-220f may be reconfigured to test for proper order of component leads (e.g. testing whether a transistor is PNP or NPN).

Once set up, a test module 220a-220f may be configured to automatically perform a test when a component is placed in testing position on the test module 220a-220f. For example, for an electronic component, an electrical test may be pulsed or repeated at a convenient cycle, such that the electrical component is tested for an electrical characteristic (e.g. resistance value) as soon as the component is inserted into the test module 220a-220f. Alternatively, a test may also be initiated by a manual control (e.g. using a test start button) that may be operated by an operator.

Referring back to FIG. 2B, test modules 220a-220f may be configured with a switch controllable by test logic control 202 that allows the test modules 220a-220f to operate in a "record" mode during creation of an assembly recipe. For example, test module 200a may be configured to sense the orientation of a component for assembly when the component is placed against the sensors. At the same time, a reference value and an acceptable tolerance in connection with the component may be input into storage for later retrieval by application program 103.

Operation of the above described assembly station and functions performed by application program 103 is now described by way of illustration in the following example:

EXAMPLE

Figure 3A:
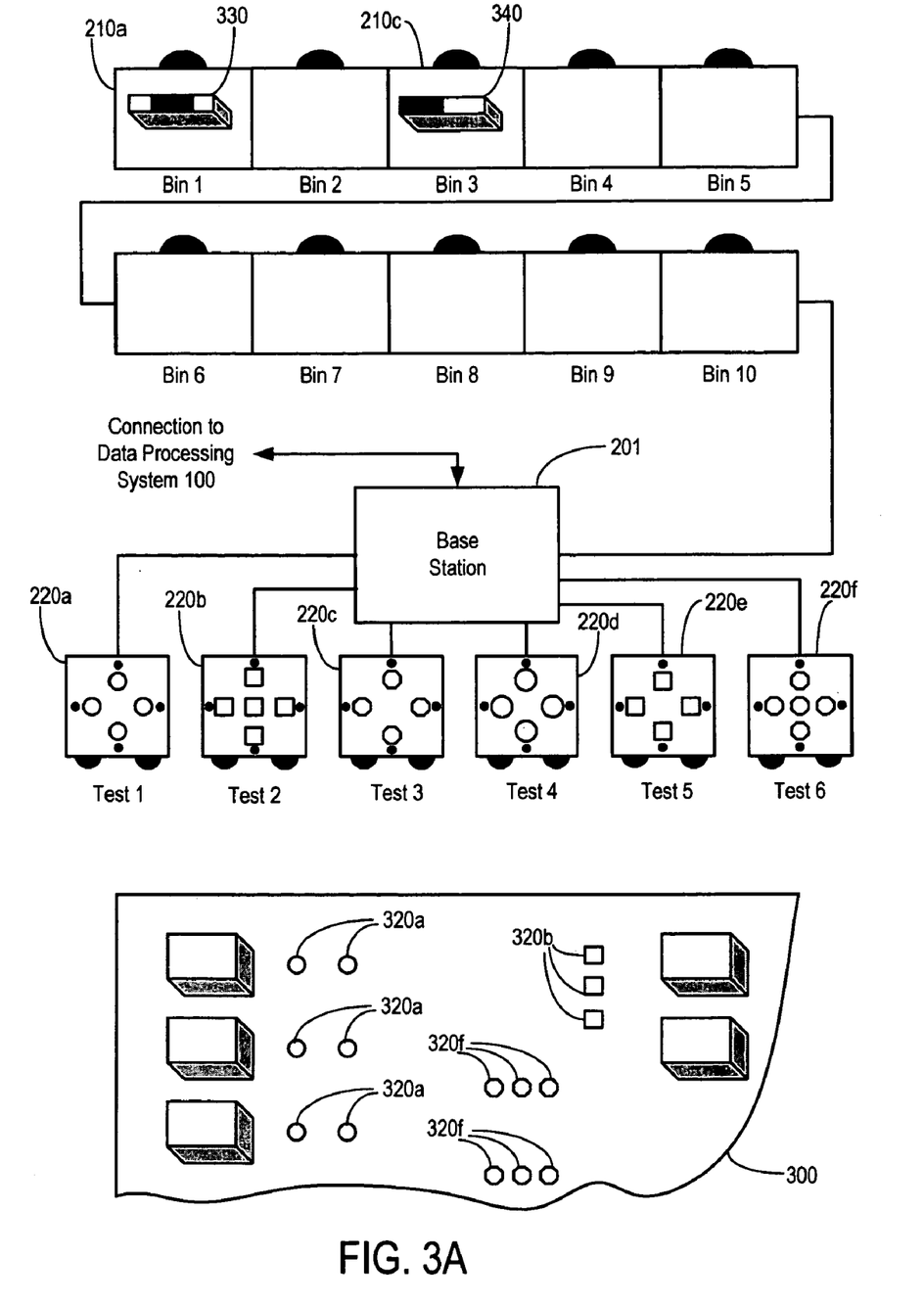
FIG. 3A to FIG. 3G show an illustrative example of guiding the assembly of two components in sequence, in accordance with an embodiment of the present invention.

FIG. 3A shows the assembly station 200 of FIG. 2 and relevant portion of a PCB 300 requiring some components to be installed. In this simplified example, two components are to be installed: component 330 currently stored in component storage bin 210a, and component 340 currently stored in component storage bin 210c. At the time illustrated in FIG. 3A, the application program 103 has not yet proceed to display the first step of the assembly recipe.

Figure 3B:
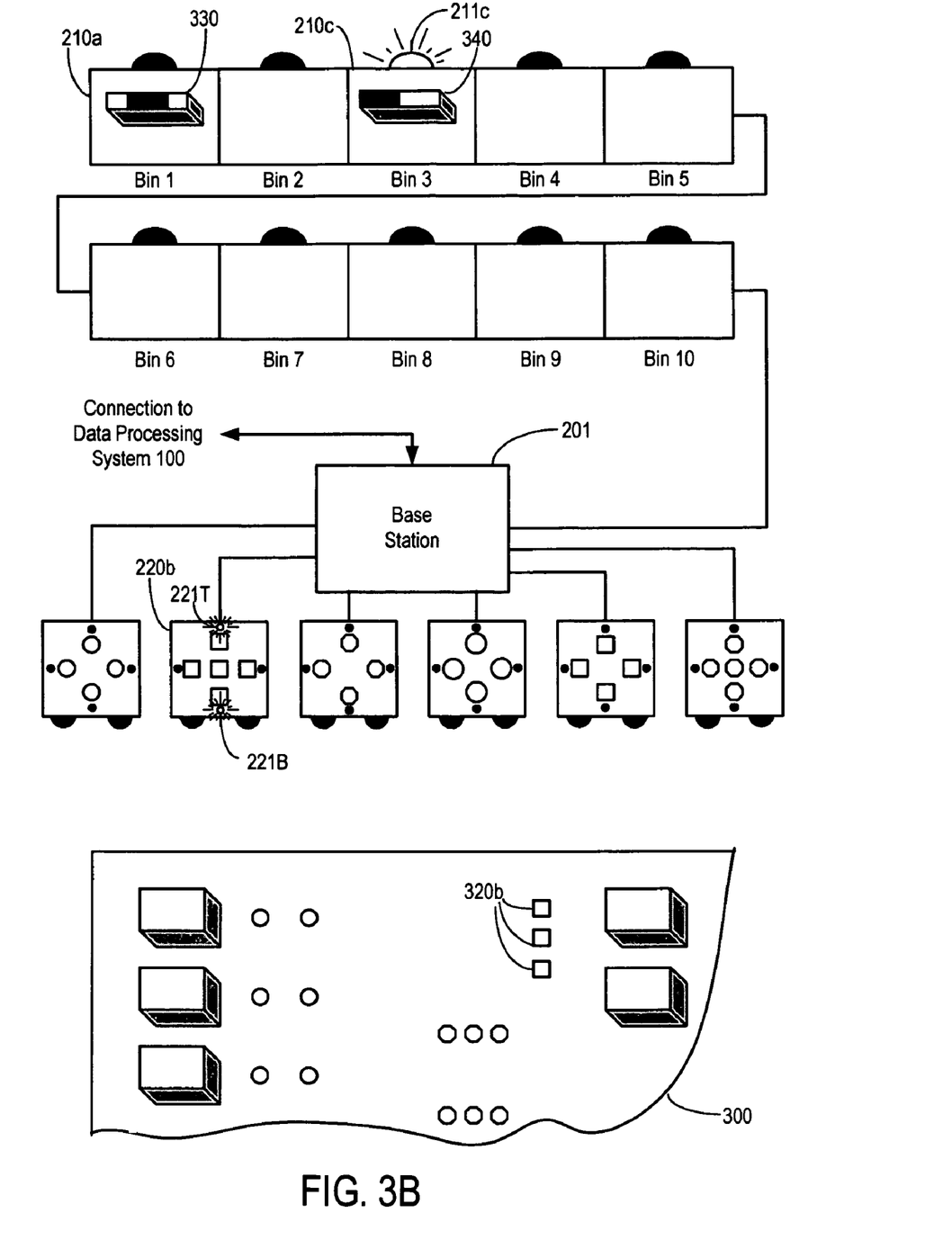

FIG. 3B shows the assembly station 200, and PCB 300 of FIG. 3A, at a point in time after application program 103 has proceeded to display the first assembly step. As shown in FIG. 3B, application program 103 and test logic control 202 have proceed to switch on component selection indicator 211c, and test selection and orientation indicators 221T, 221B on test module 220b. This guides an operator 107 to select component 340 from bin 210c, and to test the selected component 340 at test module 220b.

Figure 3C:
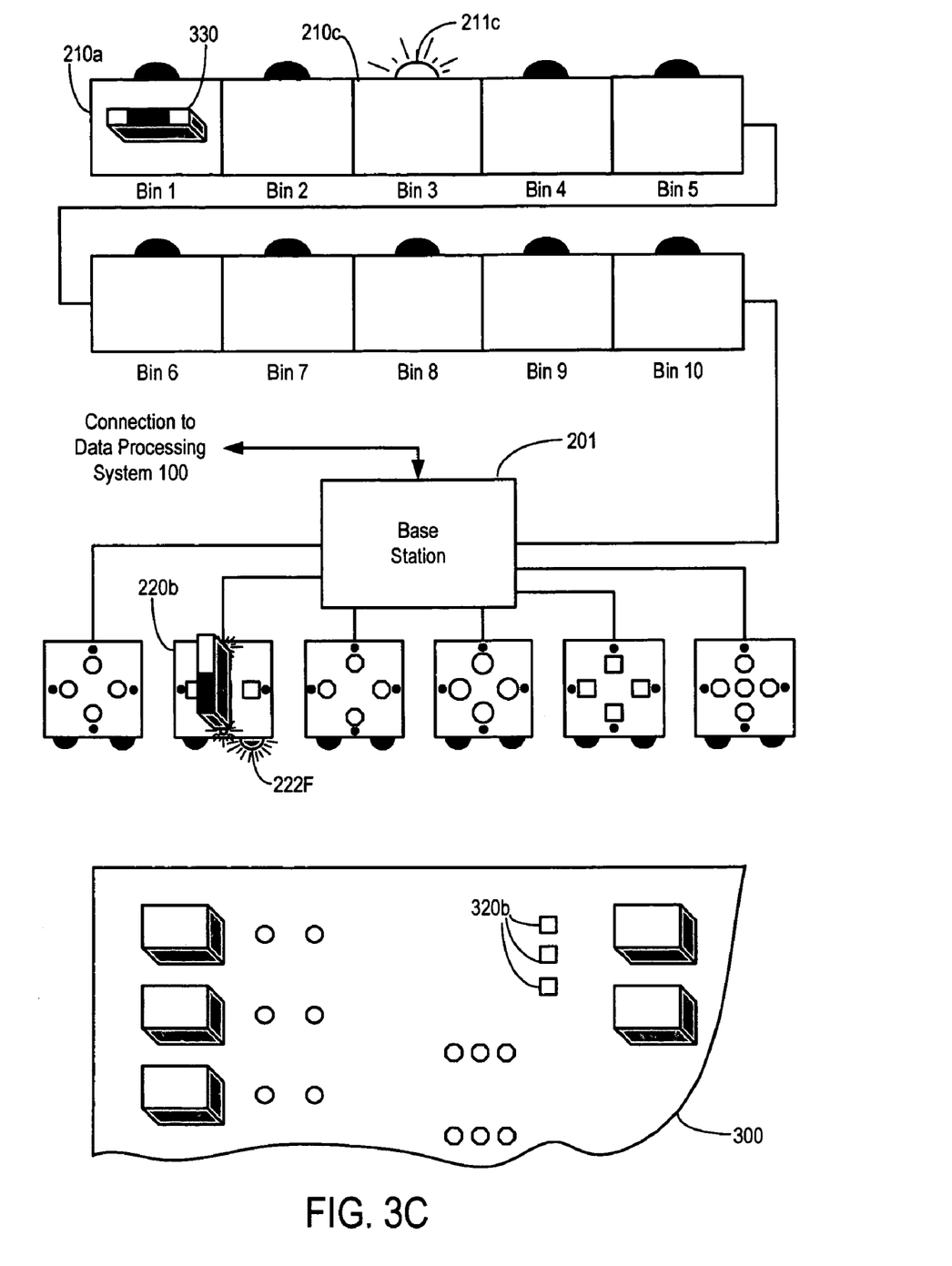

FIG. 3C shows that an operator 107, following the vertical orientation of the test selection and orientation indicators 221T, 221B, has oriented component 340 into a vertical position on test module 220b. However, test result indicator 222F lights up, indicating that the test has failed. It is possible that component 340 is faulty, or is out of the desired tolerance range. However, assume for this illustrative example that the component has a defined polarity, and is not oriented correctly.

Figure 3D:
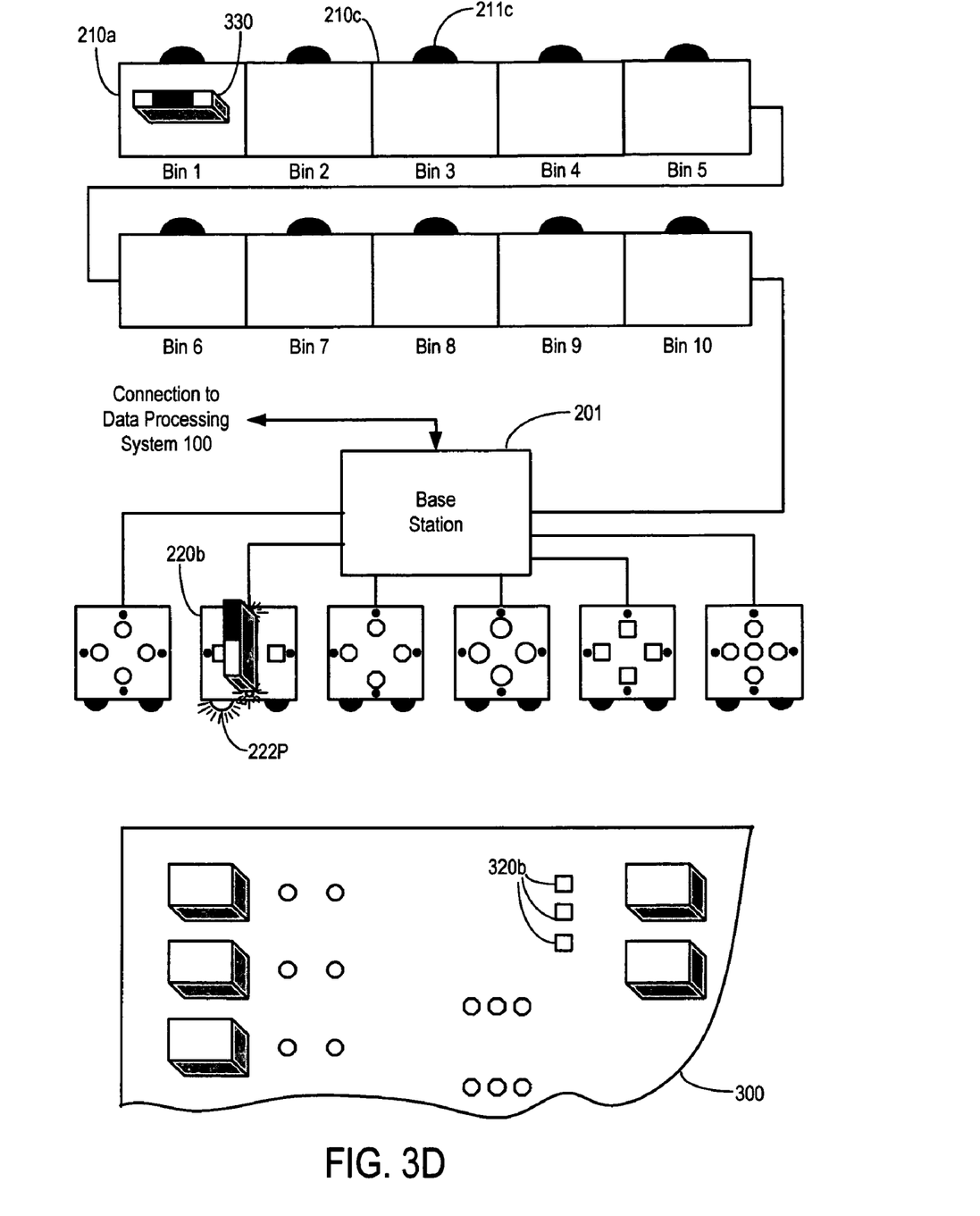

FIG. 3D shows that operator 107 has now turned the component 180 degrees from the position shown in FIG. 3C. Now, test result indicator 222P lights up to indicate that component 340 has passed—i.e. the component is within the desired range of tolerance, and is also oriented correctly for assembly onto PCB 300. Application program 103 may also display on display 108 the correct placement location for component 340 on PCB 300, as indicated in this example by holes 320b.

It has been appreciated by the inventors that assembly errors often result when a component requires reorientation for assembly onto a workpiece after being tested at a test module. Advantageously, by forcing a correct orientation for a component during testing and verification, and thereby allowing the component to be moved to the workpiece (e.g. PCB 300) without substantial reorientation, the likelihood of an assembly error may be significantly reduced.

Figure 3E:
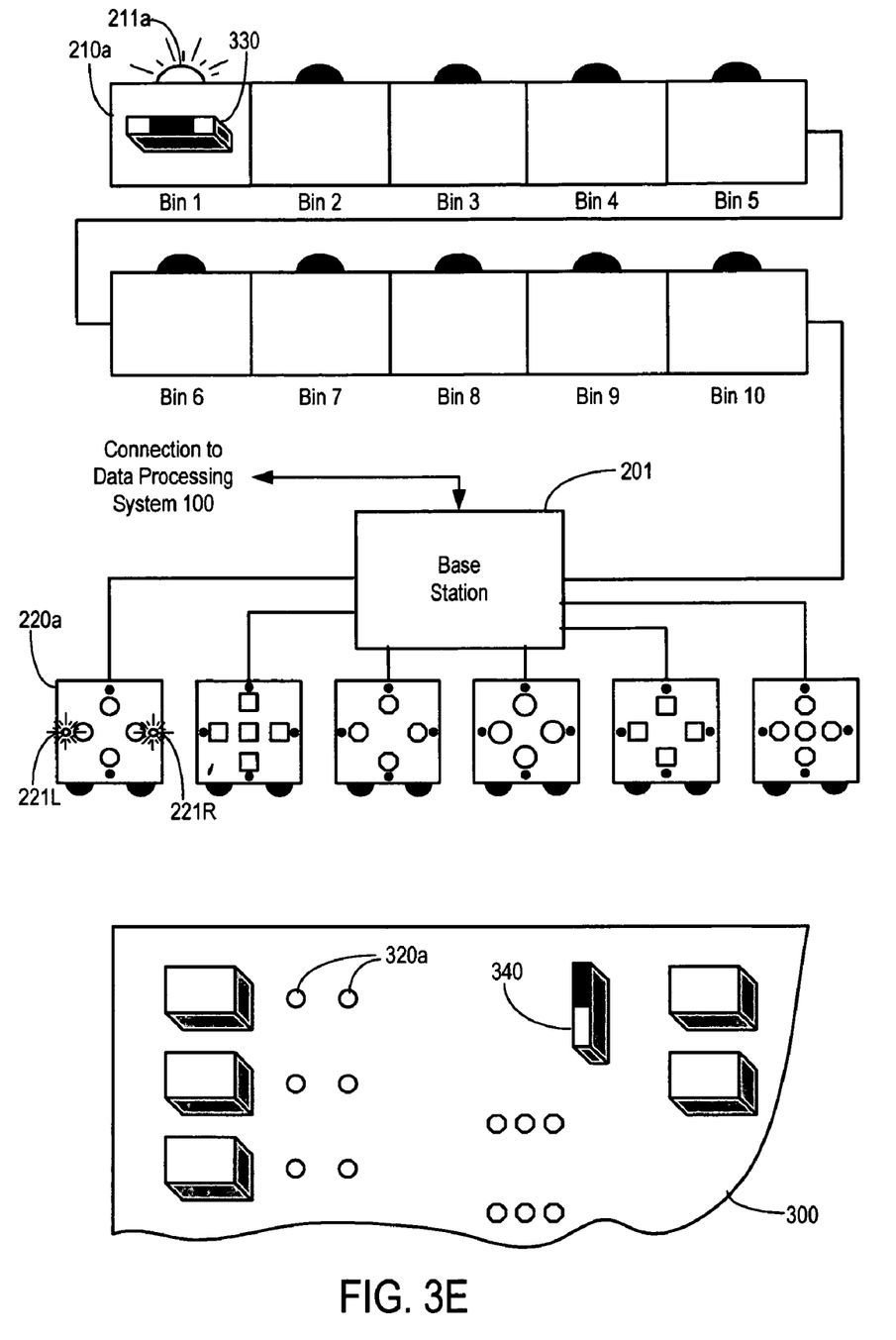

FIG. 3E shows that application program 103 has now proceeded to the next assembly step of the assembly recipe. In an embodiment, moving to the next step may be automatically triggered by the successful test result obtained at test module 220b in the previous assembly step. However, in another embodiment, in order to provide operator 107 with greater control, input to proceed to the next step may be provided by operator 107 through a push button, touch control, footswitch or the like.

Proceeding to the next assembly step is inhibited by application program 103 if a successful test indication 222P at one of the test modules 220a-220f has not occurred. In this case, operator 107 may have to select another module 340 from bin 210c and perform tests on that component. In this manner, assembly is controlled so that the next assembly step cannot be taken without successful completion of the current step.

Referring back to FIG. 3E, as application program 103 has provided the necessary indications for the next assembly step using component selection indicator 211a, and test selection and orientation indicators 221L, 221R on test module 220a, operator 107 proceeds to select component 330 from bin 210a for testing at test module 220a.

Figure 3F:
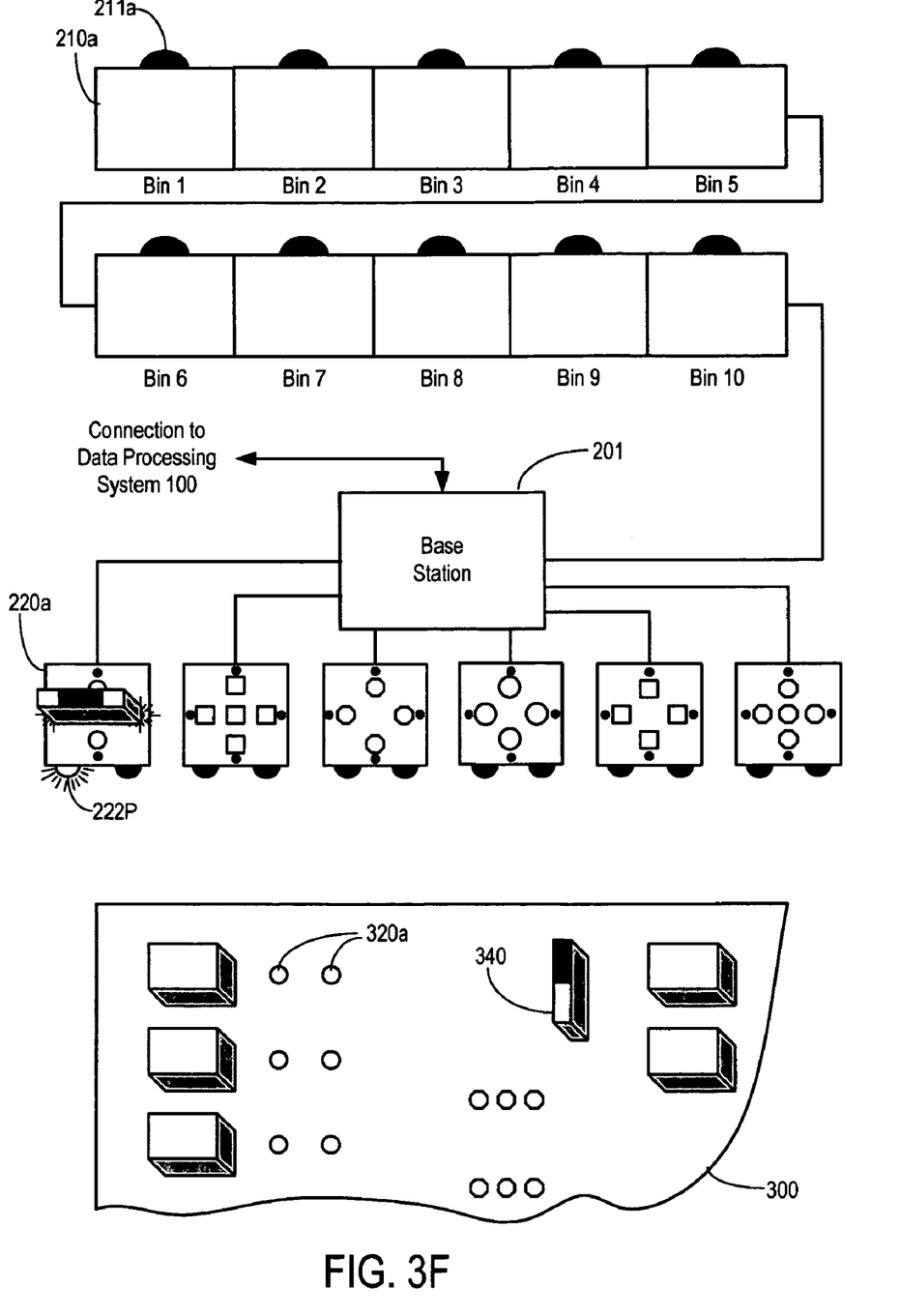

FIG. 3F shows that operator 107 has selected component 330 and, following test selection and orientation indicators 221L, 221R, has oriented component 330 in a horizontal orientation at test module 220a. In this example, component 330 may not have a polarity requiring component 330 to be in a particular horizontal orientation. As a result, test result indicator 222P, indicating that the component has passed, lights up on the first try. At the same time, application program 103 may be displaying a picture or short video segment showing where on the PCB 300 component 330 should be placed. In this example, this is illustrated by holes 320a.

Figure 3G:
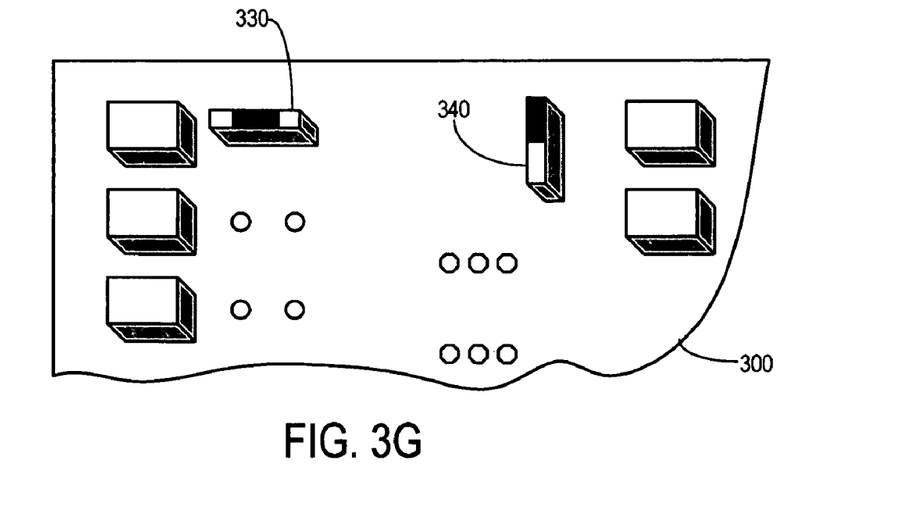

In FIG. 3G, following the instructions displayed by application program 103, operator 107 has placed component 330 in the correct location on PCB 300, and the assembly recipe is complete.

Once an operator 107 has learned the assembly recipe, the operator 107 will become proficient at selecting, testing and installing the components. However, as each step of selection and testing is verified, including correct orientation for assembly, the likelihood of assembly faults requiring rework, or discarding of the entire workpiece, is significantly reduced.

Figure 4:
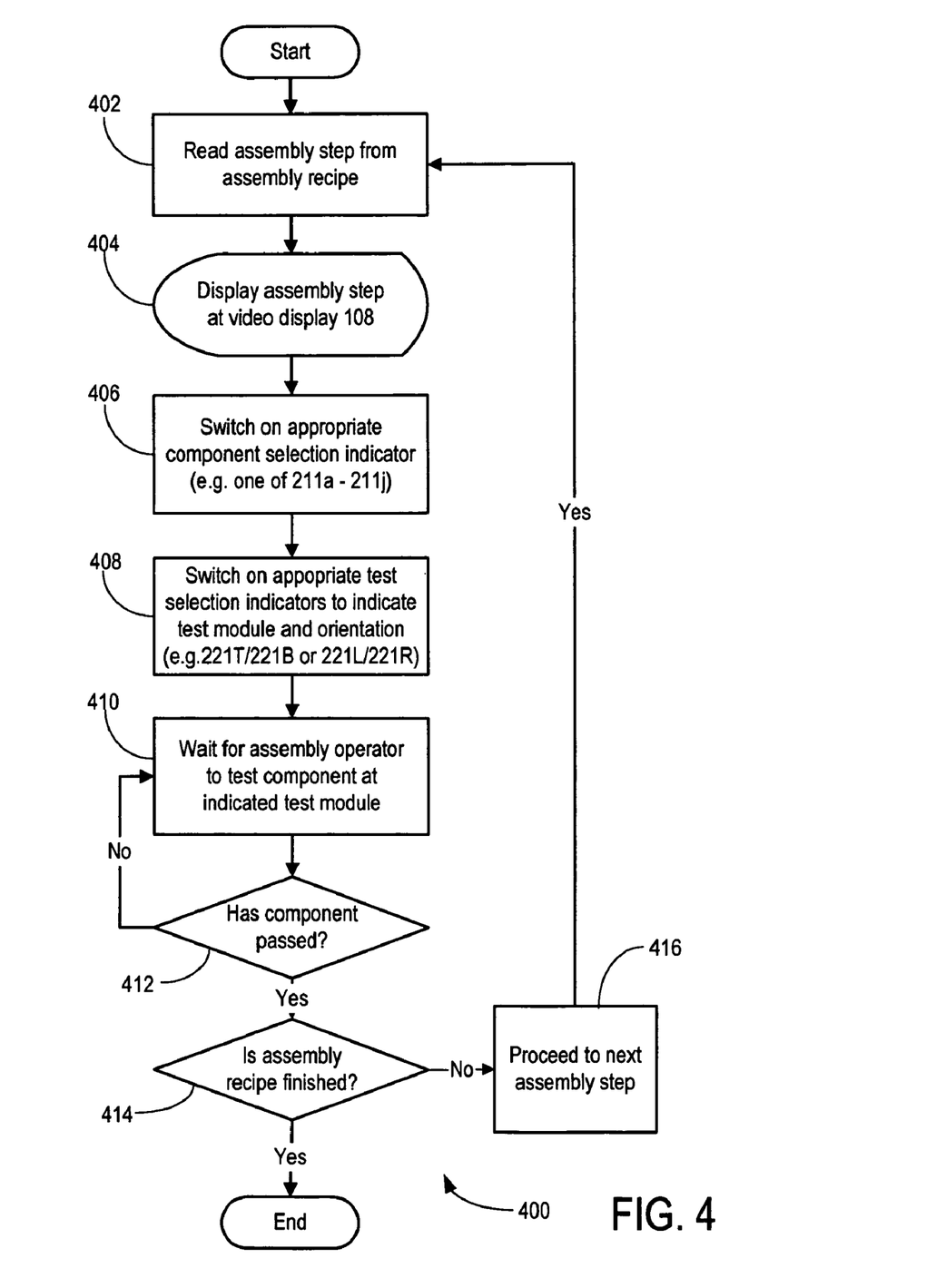
FIG. 4 shows a schematic flow chart of a method of guiding assembly, in accordance with an embodiment of the invention.

FIG. 4 shows a schematic flow chart of a method 400 of guiding assembly, in accordance with an embodiment of the invention. In an embodiment, application program 103 running on data processing system 100 of FIG. 1 may be configured to practice method 400 and also control the test modules and indicators connected to base station 201.

At block 402, method 400 may read an assembly step from a selected assembly recipe.

At block 404, method 400 may display the assembly step (e.g. at video display 108). As discussed earlier, a combination of text, graphics, and video may be used to describe and illustrate the assembly step.

At block 406, method 400 may switch on the appropriate component selection indicator (e.g. one of 211a-211j) to indicate the bin (e.g. one of bins 210a-210j) from which to select a component. (This of course assumes that the bins 210a-210j have already been filled by the appropriate types of components required for the assembly recipe.) This was illustrated, for example, in FIG. 3B.

At block 408, method 400 may also switch on the appropriate test selection indicators (e.g. 221T and 221B, or 221L and 221R) at the appropriate test module (e.g. one of 220a-220f). This was illustrated, for example, in FIG. 3B.

At block 410, method 400 waits for the assembly operator to test the component at the indicated test module.

At decision block 412, if the tested component has not passed, method 400 returns to block 410 to continue to wait. Otherwise, if the tested component has passed, method 400 proceeds to decision block 414.

At decision block 414, method 400 determines if the assembly recipe has finished. If yes, method 400 ends. Otherwise, if the assembly recipe has not finished, method 400 proceeds to the next assembly step at block 416, and returns to block 402 to read the next assembly step from the assembly recipe.

As discussed earlier, in an embodiment, proceeding to the next step may be controlled by the assembly operator. However, this will be inhibited if a component required for the current assembly step has not been successfully tested.

As will be appreciated, the assembly recipe may be repeated for another workpiece by repeating method 400 as required. Furthermore, modifications may be made to method 400 to allow an assembly operator to return to a previous assembly step to perform a retest.

While illustrative embodiments of the invention have been described above, it will be appreciated by those skilled in the art that variations and modifications may be made. Thus, the scope of the invention is defined by the following claims.

What is claimed is:

1. A system for guiding assembly, comprising:
a component selection tester for testing, prior to assembly, the correct selection of a desired component, said component selection tester includes at least one sensor, said at least one sensor configured to provide an indication of correct selection only if said desired component is placed for testing on said at least one sensor in a correct orientation for assembly; and
a component selection indicator for guiding selection of said desired component from one of a plurality of component bins.

2. The system of claim 1, further comprising an interactive guide for guiding the assembly of a plurality of components in a sequence.

3. The system of claim 2, wherein said sequence is indicated by said component selection indicator.

4. The system of claim 3, wherein said interactive guide prevents any further assembly of said plurality of components until said indication of correct selection is provided for each component in said sequence.

5. A method of guiding assembly, comprising:
testing, prior to assembly, the correct selection of a desired component using at least one sensor;
providing an indication of correct selection only if said desired component is placed for testing on said at least one sensor in a correct orientation for assembly; and
guiding selection of said desired component from one of a plurality of component bins.

6. The method of claim 5, further comprising guiding the assembly of a plurality of components in a sequence using an interactive guide.

7. The method of claim 6, further comprising indicating a sequence by said component selection indicator.

8. The method of claim 7, further comprising preventing any further assembly of said plurality of components until said indication of correct selection is provided for each component in said sequence.

* * * * *